Oct. 17, 1944.    J. A. CHENICEK    2,360,547
ALKYLATION PROCESS
Filed Oct. 29, 1943
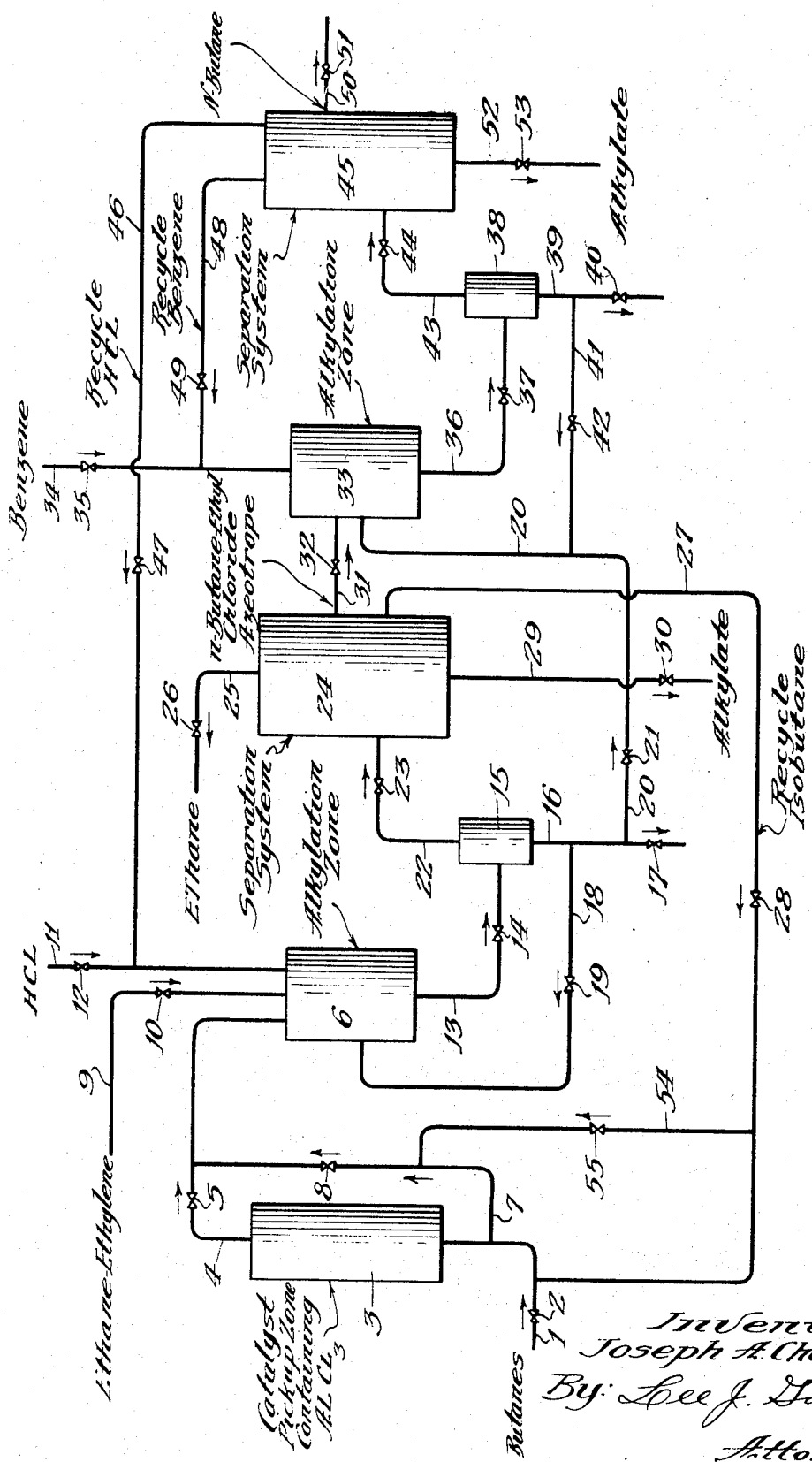
Inventor:
Joseph A. Chenicek
By: Lee J. Gary
Attorney.

Patented Oct. 17, 1944

2,360,547

UNITED STATES PATENT OFFICE 2,360,547

ALKYLATION PROCESS

Joseph A. Chenicek, Riverside, Ill., assignor to Universal Oil Products Company, Chicago, Ill., a corporation of Delaware Application October 29, 1943, Serial No. 508,176

9 Claims. (Cl. 260—671)

This invention relates to a combination alkylation process wherein valuable hexanes and alkyl aromatics are produced by a plurality of interrelated steps. The invention is specifically concerned with an improved process for alkylating isobutane with ethylene wherein ethylbenzene is obtained as a by-product of the process.

It is known that valuable hexanes can be produced by the interaction of isobutane with ethylene. When this alkylation is conducted in the presence of a suitable catalyst, e. g., aluminum chloride or an aluminum chloride-hydrocarbon complex, 2,3-dimethylbutane is obtained as the principal alkylation product. This hydrocarbon has very desirable antiknock properties and is, therefore, suitable for use in aviation gasoline blends or other motor fuels. It is generally desirable to employ hydrogen chloride as a promoter for the aluminum chloride or aluminum chloride-hydrocarbon complex catalyst.

From a commercial point of view, the isobutane-ethylene alkylation process employing an aluminum chloride catalyst presents a difficult problem. Since ethylene is not readily available in pure form, it is necessary to employ ethane-ethylyene fractions as a source of ethylene feed. These C$_2$ hydrocarbon fractions as produced in various hydrocarbon conversion processes, e. g. thermal or catalytic cracking, may contain from about 30 to about 70 mol per cent of ethylene. If this mixture is charged directly to the alkylation zone, a gaseous fraction is separated from the alkylation products which comprises unconverted ethane and hydrogen chloride. The separation of hydrogen chloride from ethane in order to permit recycling of the catalyst promoter to the alkylation zone is a relatively inconvenient and costly procedure. In order to avoid this difficulty it has hitherto been customary to provide an ethylene concentration unit which by means of a series of fractionation steps increases the concentration of ethylene in the ethane-ethylene feed to the order of 85–95 mol per cent thereby decreasing the quantity of ethane charged to the alkylation system and minimizing the ethane-hydrogen chloride separation problem.

It has been discovered that under suitable conditions substantially all of the hydrogen chloride charged to the alkylation system reacts with ethylene to produce ethyl chloride. After separation from the other reaction products the ethyl chloride may be recycled to the alkylation zone thereby replacing hydrogen chloride as a promoter. Contrary to what might be expected, there is no net consumption of the ethyl chloride recycled to the alkylation zone. Therefore, ethyl chloride can be recycled indefinitely in the system with the addition of relatively small amounts of make-up hydrogen chloride to compensate for mechanical losses, etc. of ethyl chloride.

However, ethyl chloride forms an azeotrope or constant boiling mixture with normal butane and in many cases, for example where the charge contains relatively large amounts of normal butane, it is necessary to provide suitable means for breaking up or resolving the azeotrope into its individual components whereby the ethyl chloride may be recycled to the alkylation step without recycling undesirable amounts of normal butane.

One object of the present invention is to provide a convenient method of resolving the normal butane-ethyl chloride azeotrope in order to recover a halide promoter which can be recycled to the alkylation step. Another object of the invention is to convert the ethyl chloride component of the azeotrope to a valuable aromatic hydrocarbon and simultaneously to release hydrogen chloride which can be recycled to the alkylation step.

In one specific embodiment the invention comprises reacting an isobutane feed stock with ethylene in the presence of an aluminum chloride catalyst and hydrogen chloride under alkylating conditions, separating a normal butane-ethyl chloride azeotrope from the reaction products, contacting said azeotrope with benzene in the presence of a suitable alkylating catalyst under conditions adequate to effect alkylation of the benzene with the ethyl chloride component of said azeotrope, separating hydrogen chloride from the reaction products of said last named alkylation step, and recycling said separated hydrogen chloride to said first named alkylation step.

The term aluminum chloride catalyst as used in this specification and appended claims is intended to include aluminum chloride per se, aluminum chloride supported on various relatively inert carriers, aluminum chloride composited with other catalytic materials such as other metal halides, and aluminum chloride-hydrocarbon complexes. The preferred method of utilizing aluminum chloride to catalyze the reaction of isobutane with ethylene is in the form of a fluid aluminum chloride-hydrocarbon complex. Various complexes may be prepared by contacting olefins, aromatics, naphthenes, paraffins, or mixtures thereof with aluminum chloride under suitable reaction conditions and preferably in the presence of hydrogen chloride. It will be apparent that a wide variety of complex catalysts may be prepared dependent upon the particular hydrocarbons chosen to react with the aluminum chloride, the relative amounts of reactants, the reaction conditions, etc. In general I prefer to employ an aluminum chloride-hydrocarbon complex of the type which is formed when isobutane and ethylene are contacted with aluminum chloride under alkylating conditions. The nature of my preferred catalyst will be described hereinafter in greater detail.

Reference is now made to the drawing which is a diagrammatic illustration of the arrangement of the various steps of the process.

A butane feed stock comprising iso and normal butanes is introduced through line 1 and valve 2 to pickup zone 3 which contains a bulk supply of aluminum chloride usually in granular form. The aluminum chloride in zone 3 may also be present in the form of a composite with a suitable inert carrier or with other metal halides. It is also possible to provide aluminum chloride in the form of a fluid melt or in other suitable forms. The conditions of temperature, pressure, and hydrocarbon flow rate in zone 3 are adjusted in order to dissolve a controlled portion of aluminum chloride. The effluent solution of aluminum chloride in hydrocarbon is withdrawn through line 4 containing valve 5 and is introduced into alkylation zone 6. It is often desirable to employ a split feed flow wherein a portion of the original butane charge is introduced directly to the alkylation zone. This is accomplished by diverting a portion of the stream in line 1 through line 7 containing valve 8 and thence through line 4 into alkylation zone 6.

Zone 6 comprises a reaction zone wherein at least a portion of the aluminum chloride introduced from line 4 is retained by some suitable means. In one method of operation, zone 6 may comprise a packed reaction zone containing a suitable inert granular packing material such as quartz, fire brick, silica, silica-alumina, semi-porcelain packing agents, etc. The packing provides an effective amount of surface which serves to retain a portion of the aluminum chloride catalyst and to provide a contacting surface for the catalyst and hydrocarbon reactants. In the preferred method of operation zone 6 comprises a mechanically agitated reaction zone containing a fluid aluminum chloride-hydrocarbon complex. The fresh aluminum chloride introduced in solution from line 4 is converted or otherwise incorporated into the aluminum chloride-hydrocarbon complex in zone 6. An ethane-ethylene fraction is charged to the alkylation zone through line 9 containing valve 10. Hydrogen chloride is also added through line 11 and valve 12. The effluent mixture of catalyst and reaction products is passed through line 13 and valve 14 to a settler 15. A portion of the lower catalyst layer may be withdrawn from the system through line 16 containing valve 17 but a major portion thereof is preferably recycled through line 18 and valve 19 to alkylation zone 6. In the event that zone 6 comprises a packed reaction zone, zone 15 may then comprise a much smaller zone for the continuous or periodic removal of smaller amounts of "sludge" or aluminum chloride-hydrocarbon complex. An upper hydrocarbon layer in zone 15 is introduced through line 22 and valve 23 to separation system 24.

It will be apparent that the aluminum chloride content of the aluminum chloride-hydrocarbon complex catalyst in alkylation zone 6 may be controlled accurately by the addition of regulated amounts of aluminum chloride from pickup zone 3. The amount of aluminum chloride carried over from zone 3 is dependent upon the proportion of butane charge passed through the zone and also upon the temperature therein. For optimum production of 2,3-dimethyl-butane it is desirable to maintain the aluminum chloride content of the complex catalyst within the range of from about 60 to about 85% by weight based on $Al_2O_3$ analysis. The alkylation reaction may be conducted at temperatures of from about 50° F. to about 170° F., preferably 100° F. to 140° F., and under sufficient pressure to maintain at least a portion of the reactants in the liquid phase. It is also desirable to maintain an appreciable mol excess of isobutane over ethylene in the hydrocarbons charged to the alkylation step, e. g. from about 4:1 to about 20:1.

It will be understood that separation zone 24 is a diagrammatic representation of any suitable arrangement of separating steps comprising fractionators, absorbers, solvent extraction steps, etc. Gaseous ethane is discharged through line 25 and valve 26. An isobutane-ethylene alkylate is recovered through line 29 containing valve 30 and may be subjected to additional fractionation or separation steps not shown in order to separate valuable hexanes, particularly 2,3-dimethylbutane, from higher boiling alkylation products such as octanes. Unconverted isobutane is recycled through line 27 and valve 28 to line 1, or if desired all or a portion of the recycle isobutane may be introduced directly to zone 6 through line 54 containing valve 55 and thence through lines 7 and 4 to zone 6.

As hereinbefore described, it has been found that the hydrogen chloride charged to the alkylation step is substantially completely converted to ethyl chloride by reaction with a portion of the ethylene feed. Since ethyl chloride has a normal boiling point of 12.2° C. it may be condensed readily and the unconverted ethane may be vented from the system as a gas. Ethyl chloride forms an azeotrope with normal butane, however, and it is desirable to recover ethyl chloride from the azeotropic mixture in order to recycle the same to the alkylation step without the necessity of recycling excessive amounts of normal butane. There are no indications that an azeotrope is formed between isobutane and ethyl chloride. At atmospheric pressure the normal butane-ethyl chloride azeotrope contains approximately 12–13 mol per cent ethyl chloride and has a boiling point almost identical with that of pure normal butane.

The normal butane-ethyl chloride azeotrope may be withdrawn from separation step 24 through line 31 containing valve 32 and is introduced into alkylation zone 33. Benzene is introduced to said zone through line 34 and valve 35. Zone 33 may comprise any suitable arrangement of equipment capable of effecting the interaction of benzene with ethyl chloride in the presence of a suitable alkylating catalyst, such as an aluminum chloride catalyst or other Friedel-Crafts type catalyst. The preferred catalyst for this alkylation step also comprises a fluid aluminum chloride-hydrocarbon complex. Under suitable conditions and by proper regulation of catalyst flow rates and activities, it is possible to employ a portion of the aluminum chloride-hydrocarbon complex from the first alkylation step as the catalyst in zone 33. Thus, a portion of the complex in line 16 may be diverted through line 20 containing valve 21 and thence into zone 33. Although benzene is the preferred aromatic hydrocarbon to be employed as a reactant in alkylation zone 33, it is within the scope of the invention to employ any suitable aromatic or alkyl aromatic hydrocarbon capable of interacting with ethyl chloride, for example, toluene, xylene, naphthalene, etc.

The effluent reaction mixture is passed through line 36 and valve 37 to settler 38. A portion of the lower catalyst layer is withdrawn through line 39 containing valve 40 and another portion thereof is preferably recycled through line 41 containing valve 42 and thence through line 20 to zone 33. The upper hydrocarbon layer from settler 38 is charged through line 43 containing valve 44 to separation system 45 which again is a diagrammatic representation of any suitable arrangement of separating equipment. Unconverted benzene is returned to the alkylation step through line 48 containing valve 49. During the interaction of benzene with ethyl chloride, hydrogen chloride is also produced and may be recycled through line 46 containing valve 47 to line 11 and thence into the isobutane-ethylene alkylation zone 6. Unconverted normal butane is withdrawn from the system through line 50 containing valve 51. Alkylation products comprising principally monoethylbenzene alone with smaller amounts of polyethylbenzenes are withdrawn through line 52 and valve 53 and may be subjected to further fractionation in order to separate monoethylbenzene from polyethylbenzenes.

The reaction in zone 33 may be carried out at a temperature within the range of from about 30° F. to about 200° F. dependent largely upon the particular catalyst chosen. It is generally desirable to maintain a substantial mol excess of benzene over ethyl chloride in the reactants charged to zone 33 in order to promote the formation of monoethylbenzene and to prevent undesirable side reactions. The pressure in zone 33 is preferably sufficient to maintain at least a portion of the reactants in the liquid phase.

It will be apparent to those skilled in the art that the necessary pumps and compressors must be provided in order to charge the various reactants and to recycle catalyst, hydrogen chloride, and unconverted reactants. These details have been omitted from the drawing, however, in the interest of simplicity. It will also be apparent that the invention does not reside in any particular arrangement of apparatus or method of conducting the two alkylation steps. For example, in either alkylation step it is within the scope of the invention to employ other schemes than the one shown. One common method of operation comprises the use of a fixed bed of aluminum chloride catalyst wherein the catalyst comprises a solid composite of aluminum chloride on a suitable carrier.

I claim as my invention:

1. In a process for the alkylation of isobutane with ethylene in the presence of an aluminum chloride catalyst and hydrogen chloride wherein a normal butane-ethyl chloride azeotrope is separated from the reaction products, the improvement which comprises alkylating an aromatic hydrocarbon with the ethyl chloride component of said azeotrope in a separate alkylation step, separating hydrogen chloride from the reaction products of said aromatic alkylation step, and returning said separated hydrogen chloride to the isobutane-ethylene alkylation step.

2. The process of claim 1 wherein said aromatic hydrocarbon comprises benzene.

3. The process of claim 1 wherein said aluminum chloride catalyst consists essentially of an aluminum chloride-hydrocarbon complex.

4. The process of claim 1 wherein said aluminum chloride catalyst consists essentially of an aluminum chloride-hydrocarbon complex formed by contacting isobutane and ethylene with aluminum chloride under alkylating conditions.

5. An alkylation process which comprises charging a butane fraction containing iso and normal butanes, a $C_2$ hydrocarbon fraction comprising ethane and ethylene, and hydrogen chloride to a first alkylation step employing an aluminum chloride catalyst and maintained under alkylating conditions; separating ethane from the reaction products and withdrawing said separated ethane from the system; separating unconverted isobutane from the reaction products and recycling said isobutane to said first alkylating step; recovering an isobutane-ethylene alkylate from the reaction products; separating a normal butane-ethyl chloride azeotrope from the reaction products; introducing said azeotrope into a second alkylation step and therein alkylating benzene with the ethyl chloride component of said azeotrope whereby to produce ethylated benzene and hydrogen chloride; separating hydrogen chloride from the reaction products of said second alkylation step and recycling said separated hydrogen chloride to said first alkylation step; separating normal butane from the reaction products of said second alkylation step and withdrawing said normal butane from the system; and recovering ethylated benzene from the reaction products of said second alkylation step.

6. The process of claim 5 wherein said second alkylation step is conducted in the presence of an aluminum chloride catalyst.

7. An alkylation process which comprises charging isobutane, normal butane, ethane, ethylene, and hydrogen chloride to a first alkylation zone wherein intimate contact is effected with a fluid aluminum chloride-hydrocarbon complex under alkylating conditions; withdrawing reaction products and catalyst from said first alkylation zone to a settling zone to form an upper reaction products layer and a lower catalyst layer; recycling at least a portion of said lower catalyst layer to said first alkylation zone; maintaining the alkylating activity of the aluminum chloride-hydrocarbon complex in said first alkylation zone at the desired level by introducing to said alkylation zone controlled amounts of fresh aluminum chloride; separating from said upper reaction products layer an ethane fraction, an unconverted isobutane fraction, a normal butane-ethyl chloride azeotrope, and an isobutane-ethylene alkylate; withdrawing said ethane fraction from the system; recycling said unconverted isobutane fraction to said first alkylation zone; recovering said isobutane-ethylene alkylate; introducing said normal butane-ethyl chloride azeotrope and benzene into a second alkylation zone wherein the alkylation of benzene with the ethyl chloride component of said azeotrope is effected in the presence of a suitable alkylating catalyst; withdrawing reaction products from said second alkylation zone and separating said reaction products into a hydrogen chloride fraction, a normal butane fraction, an unconverted benzene fraction, and an ethylated benzene fraction; recycling said hydrogen chloride fraction to said first alkylation zone; withdrawing said normal butane fraction from the system; recycling said unconverted benzene fraction to said second alkylation zone; and recovering said ethylated benzene fraction.

8. The process of claim 7 wherein controlled amounts of fresh aluminum chloride are introduced into said first alkylation zone by passing a butane fraction through a pickup zone containing a bulk supply of fresh aluminum chloride under conditions adequate to dissolve a portion of said fresh aluminum chloride, and introducing the resultant solution of aluminum chloride into said first alkylation zone.

9. The process of claim 7 wherein the catalyst employed in said second alkylation zone comprises at least a portion of the lower catalyst layer withdrawn from the settling zone associated with said first alkylation zone.

JOSEPH A. CHENICEK.